J. T. SNOW.
VALVE.
APPLICATION FILED AUG. 31, 1914.
1,182,939.
Patented May 16, 1916.
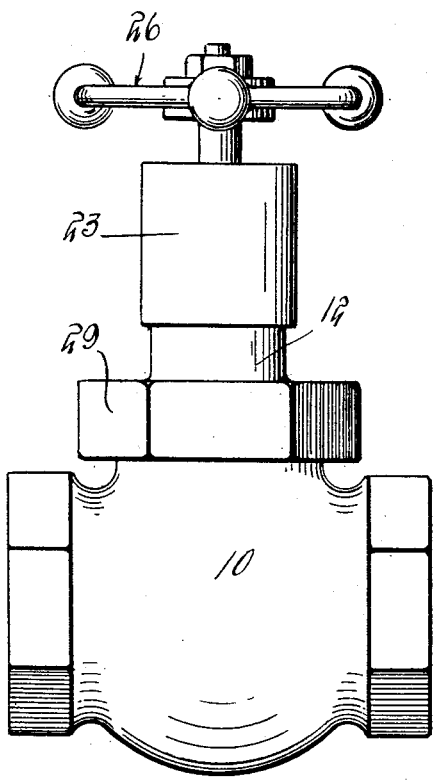
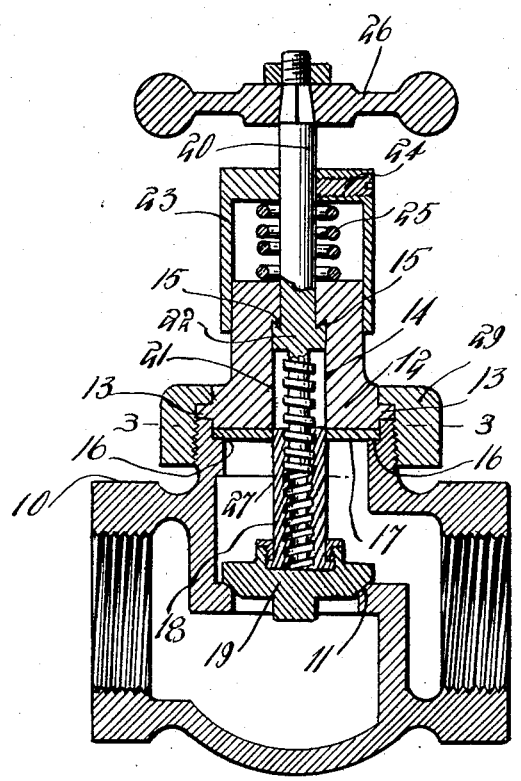
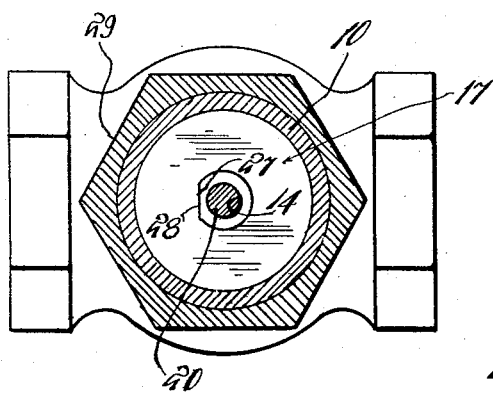
Witnesses
Inventor
J. T. Snow.
By 
Attorneys

UNITED STATES PATENT OFFICE.

JOSEPH T. SNOW, OF BROOKLYN, NEW YORK.

VALVE.

1,182,939.  Specification of Letters Patent.  Patented May 16, 1916.

Application filed August 31, 1914. Serial No. 859,526.

*To all whom it may concern:*

Be it known that I, JOSEPH T. SNOW, a citizen of the United States, residing at Brooklyn, in the county of Kings, State of New York, have invented certain new and useful Improvements in Valves; and I do hereby declare the following to be a full, clear, and exact description of the invention, such as will enable others skilled in the art to which it appertains to make and use the same.

This invention relates to improvements in valves, and particularly to the type of reciprocating valves.

The principal object of the invention is to provide a reciprocating valve which does away with the use of packing in the bonnet of the valve.

Other objects and advantages will be apparent from the following description, when taken in connection with the accompanying drawings.

In the drawings: Figure 1 is an elevation of a valve embodying my invention. Fig. 2 is a vertical sectional view therethrough. Fig. 3 is a horizontal sectional view on the line 3—3 of Fig. 2.

Referring particularly to the accompanying drawings, 10 represents the body of the valve which is of the globe type and is provided with the usual valve seat 11. A removable bonnet 12 is engaged on the upper portion of the valve casing and is formed with a circumferential bead or flange 13 which rests on the body of the valve. Formed vertically through the center of the bonnet is a bore 14, the upper end portion of which is slightly reduced in diameter and at the point of change of diameter is formed the circular shouldered seat 15. Within the body of the valve, and in the upper portion thereof is formed a circumferential ledge or shoulder 16 on which is disposed a disk 17, the portion of the bonnet 12 which extends within the body of the valve resting on this disk. A vertically disposed internally threaded stem 18 is arranged within the body of the valve and has detachably secured thereto the valve head 19 which is arranged to engage with the seat 11. A valve stem 20 is disposed through the bore 14 and carries a lower threaded portion 21 which is screwed into the internally threaded stem 18. A circumferential enlargement 22 is formed on the stem 20 within the bonnet and bears against the seat 15. Engaged on the upper end of the bonnet is a vertically sliding cap 23 which is locked to the stem 20 by means of a set screw 24. Between the cap and the top of the bonnet is arranged a coiled spring 25 which is compressed when the cap is pushed down and the screw 24 driven into locking position. A hand wheel 26 is carried by the upper end of the stem 20. The hollow stem 18 is formed with a flat side 27 for engagement by the flat face 28 formed in the wall of the opening of the disk 17. A cap nut 29 is engaged on the bead 13 and screwed onto the body of the valve to hold the bonnet securely in place.

The upward pressure of the spring 25 pushes the cap 23 upwardly and holds the enlargement 22 firmly against the shoulder 15, this joint being a ground one and liquid and steam tight. Upon rotation of the stem 20 the stem 18 will be drawn upwardly or forced downwardly to raise or lower the valve head 19 with respect to its seat 11. Thus the necessity for packing in the bonnet of the valve is obviated, the spring 25 holding the joint 22 and 15 firmly ground into water and steam tight engagement.

What is claimed is:

In a reciprocating valve, a body having a ledge in the upper portion thereof, a washer seated on the ledge and formed with a central opening having a portion of the wall flattened, a valve carrying sleeve disposed through the washer, said sleeve formed with a flattened portion associating with the flattened portion of the said washer for preventing the rotation of the sleeve, a bonnet secured on the body and having an interiorly disposed bore and a shouldered seat, a valve stem disposed through said bore and threaded into the sleeve, said sleeve adapted for vertical movement in said bore, said stem being formed with a rib engaging with the said seat, a cap disposed on the bonnet and detachably secured to the said stem, and a spring disposed between the cap and bonnet for tensioning the stem in an outward direction to hold the rib in engagement with the seat.

In testimony whereof, I affix my signature, in the presence of two witnesses.

JOSEPH T. SNOW.

Witnesses:
  Ross S. Miller,
  Stephen Michalak.